Dec. 8, 1953     L. A. REVELL     2,661,609
CUP CONSTRUCTION
Filed July 5, 1950

INVENTOR
LOUIS A. REVELL
BY
*Mason & Graham*

ATTORNEYS

Patented Dec. 8, 1953

2,661,609

UNITED STATES PATENT OFFICE 2,661,609

CUP CONSTRUCTION

Louis A. Revell, Hollywood, Calif.

Application July 5, 1950, Serial No. 172,147

1 Claim. (Cl. 65—13)

My invention has to do with cups.

It is well known that the handles of conventional cups are so easily broken that the breakage problem in restaurants and the like is extremely large. It is also a well known fact that in the manufacture of cups of conventional construction the handle and body portions must be cast separately and subsequently joined, which is relatively expensive.

It is an object of my invention to provide a cup having a handle which is sturdy and not likely to be accidentally broken.

It is another object to provide a cup having a handle which presents a convenient and highly efficient hand gripping surface.

Another object of the invention is to provide a cup having a handle which may be cast integral with the body of the cup in one molding operation.

Other objects will appear hereinafter.

Without intending thereby to limit the broader aspects of my invention, as defined by the accompanying claim, I shall now describe it in one of its presently preferred embodiments, for which purpose I shall refer to the accompanying drawings, wherein:

Figure 1:
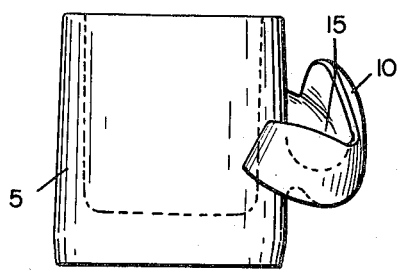
Fig. 1 is a side elevation.

Referring now to the drawings. The numeral 5 designates the bowl of the cup, which, as shown, is round in cross section and hollow. My improved handle is designated generally by the numeral 10.

The handle 10 is elongated, serpentine-shaped disposed circumferentially of the bowl exterior, and somewhat in a diagonally downward or descending direction from right to left.

Figure 2:
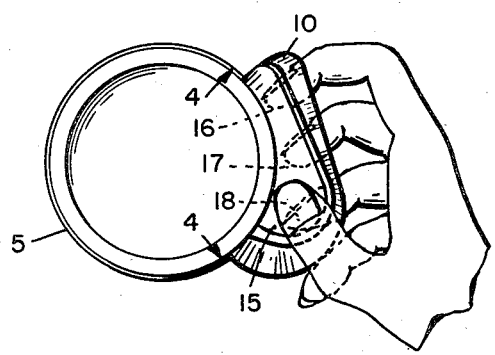
Fig. 2 is a top plan view.
Figure 3:
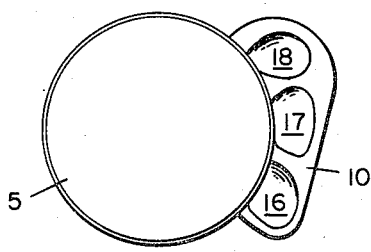
Fig. 3 is a bottom plan view.
Figure 4:
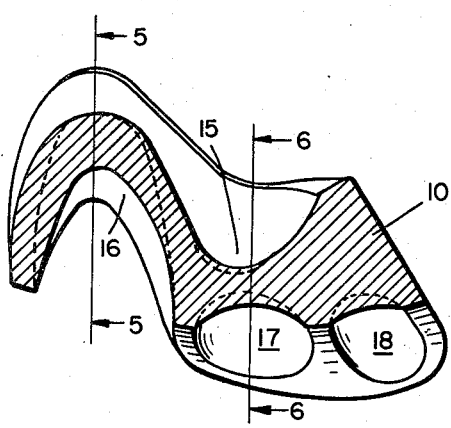
Fig. 4 is an enlarged developed section taken on the line 4—4 of Fig. 2.
Figure 5:
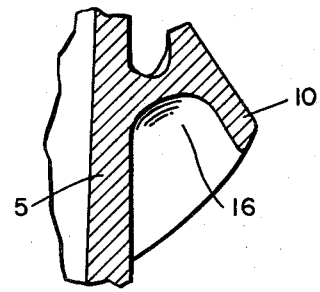
Fig. 5 is a section taken on line 5—5 of Fig. 4.
Figure 6:
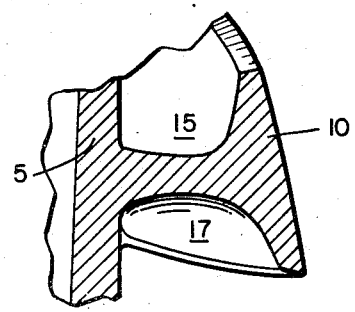
Fig. 6 is a section taken on line 6—6 of Fig. 4.

The upper surface of the handle presents an upwardly opening thumb receiving channel or recess 15 which increases in width and depth toward its lower end, so as to render it convenient to readily insert the thumb into the recess as shown in Fig. 2.

The under surface of the handle presents three downwardly opening recesses 16, 17 and 18, recess 16 being disposed to conveniently receive the first finger of the right hand, the recess 17 being disposed to conveniently receive the second finger and recess 18 being disposed to receive the third finger. In the illustrated embodiment of the invention, the handle is arranged for a right-handed person. It would be in reverse position for a left-handed person.

It will be apparent, therefore, that the handle is so disposed with relation to the bowl of the cup that it may be molded in the same operation in which the bowl of the cup is molded, and yet the cup may be easily stripped from the mold. Also, the described disposition of the handle is such that it may be readily grasped with the fingers, without having to insert the fingers in a loop-like handle, such as used in conventional cups.

I claim:

A cup comprising a hollow bowl having a serpentine-shaped handle disposed in a direction substantially circumferential of the exterior side surface of said bowl, said handle having in its bottom surface downwardly-opening finger-receiving recesses spaced apart in a direction circumferentially of said bowl and having in its top surface a serpentine-shaped upwardly-opening thumb-receiving recess.

LOUIS A. REVELL.

References Cited in the file of this patent

UNITED STATES PATENTS

| Number | Name | Date |
| --- | --- | --- |
| D. 48,993 | Spencer | May 2, 1916 |
| D. 91,653 | Guyer | Mar. 6, 1934 |
| D. 120,112 | Schmidt | Apr. 23, 1940 |
| D. 146,697 | Bates | Apr. 29, 1947 |
| 491,001 | Woodward | Jan. 31, 1893 |
| 840,043 | Cochran | Jan. 1, 1907 |
| 1,329,203 | Parry | Jan. 27, 1920 |
| 1,704,278 | Blumenthal | Mar. 5, 1929 |

FOREIGN PATENTS

| Number | Country | Date |
| --- | --- | --- |
| 627,811 | France | June 14, 1927 |